United States Patent [19]

Upmeier et al.

[11] 4,351,785
[45] Sep. 28, 1982

[54] METHOD OF CONTROLLING THE FILM THICKNESS AT A BLOWN FILM EXTRUDER INSTALLATION

[75] Inventors: Hartmut Upmeier; Gerd Klinge; Gerhard Winkler, all of Lengerich, Fed. Rep. of Germany

[73] Assignee: Windmöller & Höischer, Lengerich, Fed. Rep. of Germany

[21] Appl. No.: 214,732

[22] Filed: Dec. 9, 1980

[30] Foreign Application Priority Data

Dec. 12, 1979 [DE] Fed. Rep. of Germany ....... 2950003

[51] Int. Cl.³ .......................... B29F 3/08; G05D 5/02
[52] U.S. Cl. .................................. 264/40.1; 264/40.6; 264/564; 264/566; 425/141; 425/144; 425/326.1; 425/379 R
[58] Field of Search .................... 264/40.1, 40.7, 40.6, 264/563–566; 425/140, 141, 143, 144, 326.1, 72 R, 379 R; 264/569

[56] References Cited

U.S. PATENT DOCUMENTS

| 3,286,302 | 11/1966 | Doering | 425/141 |
| 3,368,007 | 2/1968 | Palmer | 264/40.1 |
| 3,474,160 | 10/1969 | Doering | 425/326.1 |
| 3,751,537 | 8/1973 | Scotto et al. | 264/40.6 |
| 3,768,949 | 10/1973 | Upmeier | 264/564 |
| 4,189,288 | 2/1980 | Halter | 264/40.1 |
| 4,209,475 | 6/1980 | Herrington et al. | 425/326.1 |
| 4,246,212 | 1/1981 | Upmeier et al. | 264/40.1 |

FOREIGN PATENT DOCUMENTS 2140194 8/1973 Fed. Rep. of Germany .
2723991 3/1975 Fed. Rep. of Germany .
2816583 4/1978 Fed. Rep. of Germany .
2658518 6/1978 Fed. Rep. of Germany ...... 264/569

OTHER PUBLICATIONS

Article entitled "Prozessregler in der Extrusionstechnik", published 1976.
Article entitled "Moglickkeiten der Prozessbrechneranwendung bei Flachfollen-und Tafelextrusionsanlagen", published 1978.

Primary Examiner—Jeffery R. Thurlow
Attorney, Agent, or Firm—Fleit & Jacobson

[57] ABSTRACT

A nozzle ring of an extruder for blowing tubular plastics film is divided into cooling sectors provided with adjusting elements. The thicknesses of the blown film are measured over the circumference thereof and a number of film sectors of equal circumferential length corresponding to the number of cooling sectors is established. Assuming that the film sector of maximum or minimum thickness has been extruded in the correct position for the purpose of determining the cooling sector associated with the film sector, the subsequent film sectors are in turn allocated to successive cooling sectors. The mean thickness distributions are determined from the measurements over the individual film sectors. Those cooling sectors to which film sectors were allocated having thin or thick portions exceeding a respective thin or thick portion threshold value which is a fraction of the value of the film sector with the absolute minimum or maximum thickness, respectively, are cooled or heated until the film thicknesses are within the permissible tolerance range.

6 Claims, 3 Drawing Figures

METHOD OF CONTROLLING THE FILM THICKNESS AT A BLOWN FILM EXTRUDER INSTALLATION

The invention relates to a method of controlling the film thickness at a blown film extruder installation, comprising a nozzle ring divided into cooling sectors provided with setting elements and comprising a film calibrating device and a take-off and coiling apparatus for the film, wherein the film thicknesses are measured over the circumference of the extruded film and film sectors are formed corresponding to the number of correcting sectors, the film sector of maximum or minimum thickness is assumed to have been extruded in the correct position for determining the associated cooling sector at the nozzle ring and the subsequent film sectors are successively allocated to the subsequent cooling sectors, and wherein the temperature of the respective cooling sector at the nozzle ring is changed until the desired uniform thickness distribution has been achieved over the film circumference, according to copending U.S. Pat. Application Ser. No. 209,060, filed Nov. 21, 1980.

In the method according to the referenced application, one determines over the circumference of the extruded film those film sectors which are associated with the respective correcting sectors at the nozzle ring, i.e. the film sectors which were extruded from the associated correcting sectors at the nozzle ring, and, by way of the setting elements, the correcting sectors are so influenced in accordance with whether thick or thin film portions were extruded from them that film sectors are obtained with equal circumferential lengths and thicknesses. By means of the method according to the referenced application, one can rapidly correct departures from the thickness tolerance of the film because all thick and thin portions of the extruded film are directly allocated to the corresponding correcting sectors at the nozzle ring, so that one can influence same with direct effect to set the film sectors with thick or thin portions to the mean film thickness. Although the controlling method of the referensed application can be algorithmically defined to permit the use of microprocessors and microcomputers, this is relatively expensive.

It is therefore the problem of the invention to simplify the controlling method of the referenced application.

According to the invention, this problem is solved in that film sectors of equal circumferential length are formed and from the measurements the mean thickness distributions are determined over the individual film sectors, and that those cooling sectors to which film sectors were allocated having thin portions exceeding a thin portion threshold value which is a fraction of the value of the film sector with the absolute minimum thickness are cooled until the film thicknesses are within the permissible tolerance range.

The invention is based on the discovery that sectors of the extruded tubular film with thin film portions have the most influence on lateral displacement of the subsequent film sectors. One can therefore achieve particularly rapid correction of departures from the thickness tolerance of the film by detecting the thin portions of the film and eliminating same. This is because the elimination of all thin portions necessarily results in a tubular film of the same mean thickness over its circumference. According to the invention, one employs sector cooling to eliminate the thin portions because this permits one simply and rapidly to increase the viscosity of the extruded substance that leads to a larger film thickness and thus to elimination of the preceding thin portions.

By the method of the invention, only those cooling sectors are influenced by the associated setting elements which are allocated to the film sectors with thin portions exceeding a particular threshold value. Cooling sectors allocated to film sectors with thin portions under this threshold value therefore receive no control signals so that the thin portions which are not yet correctly positioned but do not have such a large departure from the tolerance are at first not directly influenced.

With progressive elimination of the thin portions of film, the film sectors are increasingly pulled in the correct position to the associated cooling sectors. Since the threshold value in each case amounts to only a certain percentage of the minimum thickness, i.e. decreases proportionally to this minimum thickness and approaches zero, one gradually also influences the film sectors having the smaller thin portions so that the associated cooling sectors receive the appropriate cooling commands.

Since the mean film thickness is kept constant by the automatic increase or reduction in the take-off speed, the thick portions in the film are thus likewise progressively reduced and brought to zero.

The definition of a thin threshold value is necessary because a mere reduction in the respective minimum thickness would not give results. This is because as soon as a minimum thickness has been reduced to the value of the following largest thin portion, no clear minimum thickness is any longer available so that thin portions to be influenced can be influenced only by determining the thin portion threshold value. Since this threshold value is variable, the control becomes progressively finer.

Of course it is also possible to detect the thick portions of film and to correct them corresponding to the thin portions. In that case, correction of the thin and thick portions of film can likewise take place simultaneously.

To control the film thickness of blown film extruder installations equipped with reversing take-off apparatuses, it is desirable to interrupt the reversing rotary motion a short time before and during the measurement of film thicknesses over the circumference of the tubular film. The torsional angle received by the film bubble as a result of twist during the reversing take-off motion can hardly be compensated by calculation because it is influenced in a relatively complex manner by the effect of the calibrating apparatus on the film bubble, particularly if the calibrating apparatus is stationary or reversible, for example in the production of films with side folds. To measure the film thickness, the reversing take-off apparatus can be temporarily stopped because the measuring equipment revolves at a speed which is a multiple of the reversing rotation, so that the uniformity of the coil of film is not markedly affected by temporarily stopping the reversing motion of the take-off apparatus. In addition, with increased distribution of the film thickness tolerance departures, a distribution of the thick and thin portions on the coil by the reversing take-off becomes more dispensible.

An example of the invention will now be described in more detail with reference to the drawing, wherein.

Figure 1:
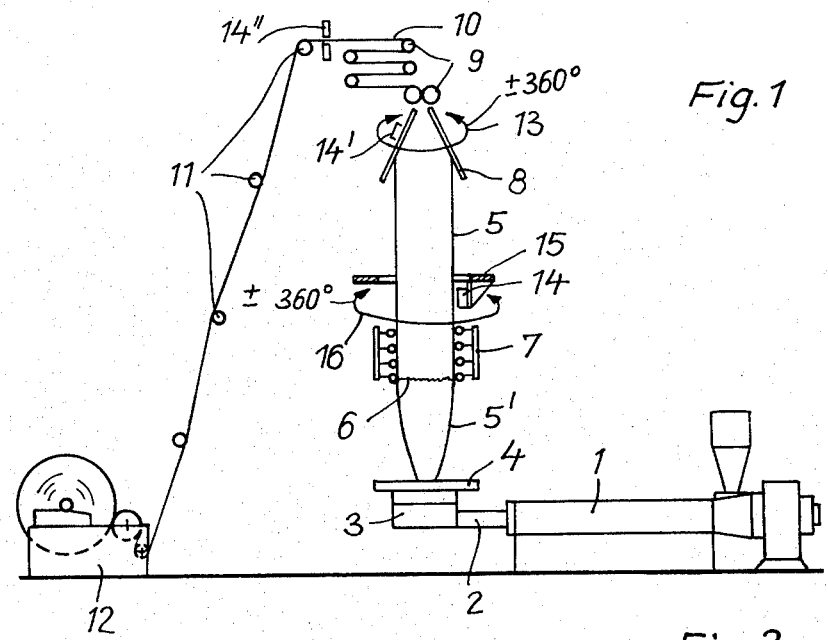
FIG. 1 is a diagrammatic side elevation of a blown film installation with equipment for detecting the thickness tolerances.
Figure 2:
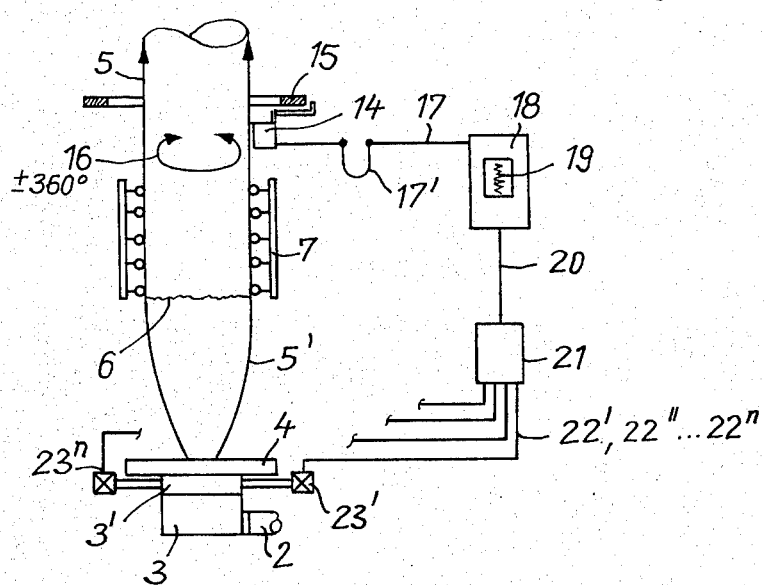
FIG. 2 is a diagrammatic representation of the relationship between the thickness measuring means and the setting elements of the cooling sectors at the nozzle ring.

In the installation diagrammatically shown in FIG. 1, the extruder 1 feeds the thermoplastic melt that is to be processed through the connector 2 into the film blowhead 3 with the cooling ring 4 where the melt is formed to the tubular film 5. At the level of the film rigidification line 6 there is diagrammatically indicated film calibrating apparatus 7 which determines the diameter of the tubular film and thus the width of the flattened web of film. The tubular film is flattened by means of the flattening plates 8, withdrawn by the take-off rollers 9 and the subsequent reversing rollers, and fed as a flattened web 10 of film through the guide rollers 11 to the stationary coiler 12 where it is wound up.

The measuring head 14 is disposed preferably above the calibrating apparatus 7 on an annular cross-member 15, the arrow 16 indicating the measuring movement through ±360°. To avoid any influence on the measuring result by the twist in the film as a result of the reversing take-off, the reversing motion is stopped shortly before and during the measurement. This interruption in the reversing rotation is acceptable because the reversing speed 16 of the measuring turntable 14, 15 is a multiple of the reversing speed 13 of the reversing take-off apparatus 8, 9. To measure a thickness tolerance profile, the reversing motion of the take-off 8, 9 is momentarily stopped and, after a short holding time, which can be longer or shorter depending on the take-off speed of the film and serves to reduce the angle of twist of the film bubble, the measuring turntable 14, 15 is rotated. Thereafter, the reversing take-off apparatus 8, 9 is restarted. This interruption in the reversing take-off does not markedly worsen the quality of coiling because as the film thickness tolerances approach zero, one could dispense with a reversing take-off for distributing thick and thin portions in the film.

A measuring device 14 detecting the single film thickness can for example also be disposed in a position 14', at the flattening plates 8 or behind the reversing take-off apparatus 9 at a marginal zone of the flattened web 10 of film as a measuring system 14''. In the latter case, one measures the double film thickness which can be utilised with sufficient accuracy as a thickness measurement for the single layer of film. The measuring signal of the rotary measuring head 14 is fed by way of the measuring conduit 17 with the cable loop 17' which permits the reversing motion to the thickness profile indicating box 18 and is represented on the thickness tolerance diagram 19.

The thickness measurement signal can be fed as an electrical parameter by way of the connecting conduit 20 to a microprocessor 21 which appropriately transforms the measurement signals and feeds the command signals by way of the connecting conduits $22'$, $22''$ ... $22^n$ to the setting elements $23'$ ... $23^n$ for the cooling sectors.

Figure 3:
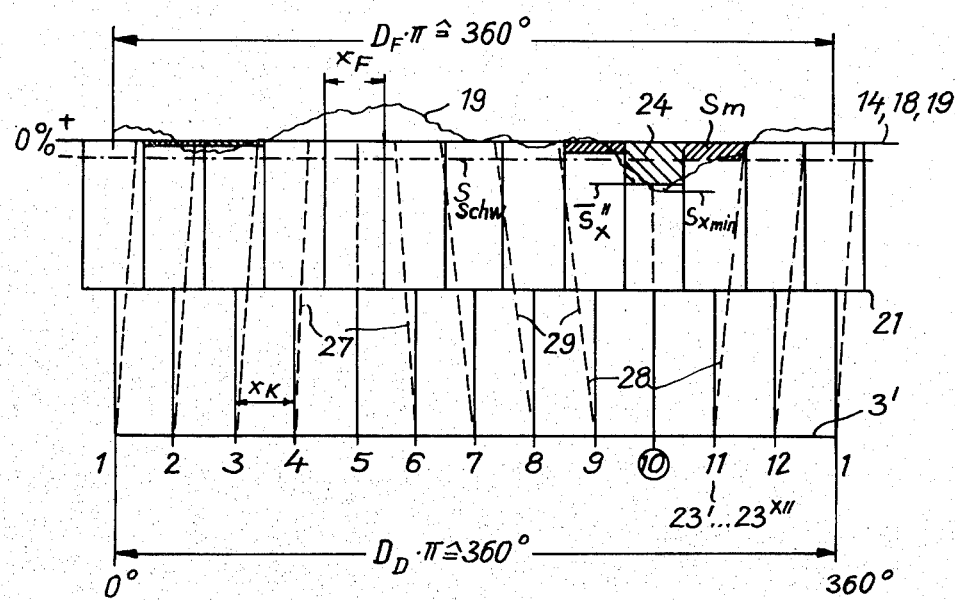
FIG. 3 is a quantitative representation of the allocation of the individual film sectors to the cooling sectors at the nozzle ring.

As will be evident from FIG. 3, after one revolution of the measuring turntable 14, 15, film sectors $x_F$ corresponding to the number of cooling sectors $x_K$ are divided off and partial mean thickness values $\bar{s}''_x$ are formed for each film sector. These partial thickness mean values $\bar{s}''_x$ form the size of the setting command for the associated cooling sectors $x_K$.

In the example of Fig. 3, it is assumed that the nozzle ring is divided into 12 cooling sectors 1 to 12. Starting from the respective centers of the cooling sectors which are characterised by the numbers 1 to 12, broken lines have been included which correspond to the lines on which individual extruded mass points run. In the case of thick portions of film, one obtains converging lines 27 and for thin portions one obtains diverging lines 28. In the representation of FIG. 3, the lines are also reduced to a unitary film diameter in the diverging zone of the film bubble so that mass points in the film zones having the thickness tolerance ±0% extend as parallel lines 29 which, however, are inclined to the side because of the adjacent thick and thin portions.

In the assumed example, thick or thin portions extending on lines parallel to the axis have been extruded from the cooling sectors 5 and 10.

The measured thickness profile has been indicated by the line 19.

The minimum thin portion $s_{xmin}$ is centrally displaced to a film sector and allocated to the cooling sector 10 on which this can be projected. The following film sectors of equal circumference are connected to the film sector having the thin portion 24.

Over the individual film sectors, there are formed the mean film thicknesses $\bar{s}''_x$ which form a measurement for the size of the command signal when they exceed the threshold value $s_{schw}$ which is a percentage fraction of the respective value of the film sector having the minimum thin portion.

We claim:

1. A method of controlling the film thickness at a blown film extruder installation, the installation comprising a nozzle ring for extruding tubular film divided into control sectors provided with setting elements, a film calibrating device, and a take-off and coiling apparatus for the film, said method comprising:

forming film sectors ($x_F$) corresponding to the number of control sectors, the film sectors having equal circumferential lengths;

measuring thicknesses over the circumference of the extruded film;

assigning the measured film thicknesses to the film sectors ($x_F$);

determining mean thickness distributions ($\bar{s}''_x$) for the individual film sectors;

determining a first film sector having maximum or minimum thickness;

assigning such first film sector to an associated control sector at the nozzle ring based on a predetermined correct relationship between such film sector and the nozzle ring not influenced by variations in thicknesses of other film sectors;

successively alloting subsequent film sectors to the subsequent control sectors; and adjusting the temperature of the respective control sectors at the nozzle ring until the desired uniform thickness distribution has been achieved over the film circumference, the control sectors to which film sectors were allocated having thin portions exceeding a thin portion threshold value which is a fraction of the value of the film sector with the absolute minimum thickness being cooled until the film thicknesses are within the permissible tolerance range.

2. A method of controlling the film thickness at a blown film extruder installation, the installation comprising a nozzle ring for extruding tubular film divided into control sectors provided with setting elements, a film calibrating device, and a take-off and coiling apparatus for the film, said method comprising:

forming film sectors ($x_F$) corresponding to the number of control sectors, the film sectors ($x_F$) having equal circumferential lengths;

measuring thicknesses over the circumference of the extruded film;

assigning measured film thicknesses to the film sectors;

determining mean thickness distribution ($\bar{s}''_x$) for the individual sectors;

determining a first film sector having maximum or minimum thickness;

assigning such first film sector to an associated control sector at the nozzle ring based on a predetermined correct relationship between such film sector and the nozzle ring not influenced by variations in thicknesses of other film sectors;

successively alloting subsequent film sectors to the subsequent control sectors; and changing the temperature of the respective control sectors at the nozzle ring until the desired uniform thickness distribution has been achieved over the film circumference, those control sectors to which film sectors were allocated having thick portions exceeding a thick portion threshold value which is a fraction of the value of the film sector with the absolute minimum thickness being heated until the film thicknesses are within the permissible tolerance range.

3. A method according to claims 1 or 2, characterised in that the cooling sectors associated with the film sectors above the thin and thick portion threshold value are cooled or heated simultaneously.

4. A method according to one of claims 1 or 2, for controlling the film thickness of blown film extruder installations equipped with reversing take-off apparatuses, characterised in that the reversing rotary motion is interrupted a short time before and during the measurement of film thicknesses over the circumference of the tubular film.

5. A method according to claim 3 for controlling the film thickness of blown film extruder installations equipped with reversing take-off apparatuses, characterized in that the reversing rotary motion is interrupted a short time before and during the measurement of film thicknesses over the circumference of the tubular film.

6. A method of controlling the film thickness at a blown film extruder installation, the installation comprising a nozzle ring for extruding tubular film divided into cooling sectors provided with setting elements, a film calibrating device, and a take-off and coiling apparatus for the film, said method comprising:

forming film sectors ($x_F$) corresponding to the number of control sectors, the film sectors ($x_F$) having equal circumferential lengths;

measuring thicknesses over the circumference of the extruded film;

assigning measured film thicknesses to the film sectors;

determining mean thickness distribution $\bar{s}''_x$) for the individual sectors;

determining the film sector of maximum or minimum thickness; and assigning such maximum or minimum film sector to an associated cooling sector at the nozzle ring based on a predetermined correct relationship between such film sector and the nozzle ring not influenced by variations in thicknesses of other film sectors;

successively alloting subsequent film sectors to the subsequent cooling sectors; and influencing the respective cooling sector at the nozzle ring until the desired uniform thickness distribution has been achieved over the film circumference, the cooling sectors to which film sectors were allocated having thicknesses exceeding a predetermined threshold value which is a function of the value of the film sector with the absolute minimum or maximum thickness being influenced until the film thicknesses are within a permissible tolerance range.

* * * * *